United States Patent

Farr et al.

[15] 3,678,454

[45] July 18, 1972

[54] GEOPHYSICAL SURVEYING USING FRESNEL PILOT SIGNALS

[72] Inventors: John B. Farr; Ralph A. Landrum, Jr., both of Tulsa, Okla.

[73] Assignee: Amoco Production Company, Tulsa, Okla.

[22] Filed: May 2, 1969

[21] Appl. No.: 821,189

[52] U.S. Cl. ............... 340/15.5 SC, 343/17.2 PC, 340/3 M, 350/160 ZP
[51] Int. Cl. ........................................................ G01v 1/28
[58] Field of Search ............... 250/229, 237; 350/160 ZP; 340/3 M, 15.5 SC; 343/17.2 PC

[56] References Cited

UNITED STATES PATENTS

| | | |
|---|---|---|
| 3,189,746 | 6/1965 | Slobodin et al. ................ 250/229 X |
| 3,404,400 | 10/1968 | Miller ........................... 340/3 X |
| 3,435,411 | 3/1969 | Lawrence ....................... 340/15.5 |
| 3,483,387 | 12/1969 | Davis ............................ 350/160 X |

OTHER PUBLICATIONS

Modulation Technique Combats Impulse Noise, Electronics, Sept. 21, 1962, pp. 62, 64, 66.

*Primary Examiner*—Benjamin A. Borchelt
*Assistant Examiner*—N. Moskowitz
*Attorney*—Paul F. Hawley and Newell Pottorf

[57] ABSTRACT

In seismic geophysical surveying, a servo-controlled vibrator is driven by a pilot signal that corresponds generally to the variations in density that are encountered in scanning at a constant rate along a radial segment of a Fresnel zone plate, and the resulting seismic waves that arrive at a spaced receiver are recorded as a conventional variable density trace. The pilot signal is thus one that becomes self-compressing by the diffraction of monochromatic light to a focal point on the axis of the zone plate. Accordingly, illumination of the recorded variable density trace by monochromatic light effectively time-compresses each repetition of the pilot signal in the recorded trace by producing in the plane of the Fresnel zone plate focus a concentration of illumination that represents by its intensity and position the amplitude and travel time of seismic wave energy from the vibrator to the receiver by a particular path. In practice, any pilot signal for which the frequency varies linearly with time is so closely similar to a true Fresnel signal that it focuses monochromatic light in the same way.

9 Claims, 5 Drawing Figures

INVENTORS
JOHN B. FARR
RALPH A. LANDRUM, JR.
BY
Newell Pottoff
ATTORNEY

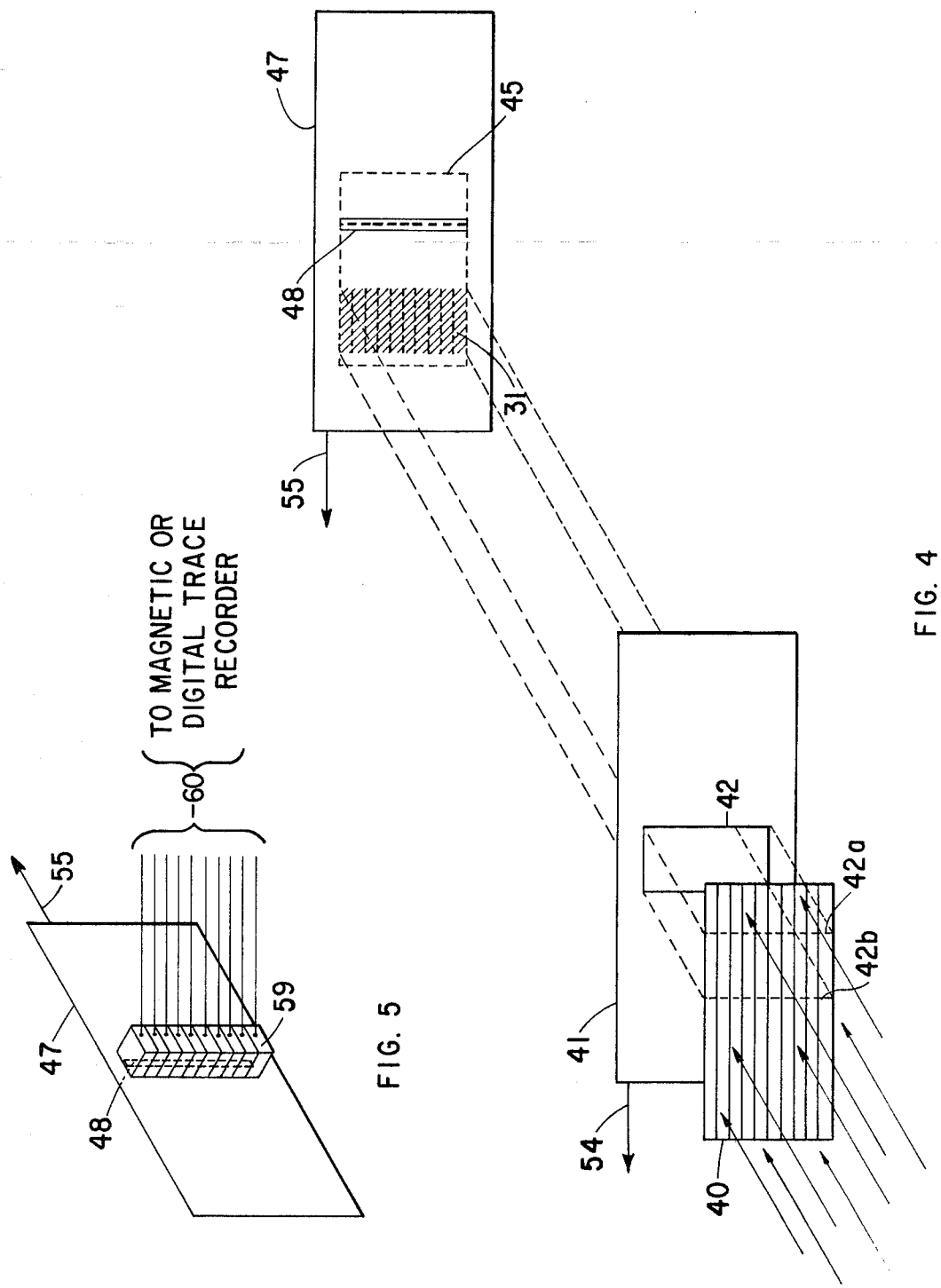

GEOPHYSICAL SURVEYING USING FRESNEL PILOT SIGNALS

BACKGROUND OF THE INVENTION

This invention relates to seismic geophysical surveying, and is directed particularly to such surveying utilizing vibratory input signals of such long time duration as to require time compression to establish the relative amplitudes and travel times of seismic energy by various paths through the earth. Still more specifically, the invention is directed to the optical processing of received seismic wave data in the form of variable density traces obtained from transmitting through the earth particular vibratory input signals for which the frequency varies in a specific way that is substantially a linear function of time.

At the present time, a widely used method of seismic geophysical surveying is that known by the trade name "-Vibroseis," in which long-duration, generally sinusoidal signals, many cycles in length and of a varying frequency during the signal duration, are transmitted into the earth by one or more servo-controlled vibrators, and the resulting signals reaching spaced receivers by various paths are recorded as corresponding functions of time. These received signals take the form of many overlapping repetitions of the long duration input signal, each repetition corresponding in amplitude and time to the relative amplitude and travel time of seismic energy along one of the many possible paths; but due to the overlap and to the complex nature of the signals, these relative amplitudes and travel times cannot be directly observed or interpreted in the received signals. Therefore, extensive signal processing is necessary to time-compress or otherwise abbreviate the overlapping received wave trains so that each can be recognized by the amplitude and relative time of a brief marker or impulse. As is well known, the mathematical process of correlation is one way of performing this time compression of the long wave trains to brief impulses. The correlation procedure, however, whether performed by analog means or by digital computer programs, represents a formidable data processing effort that is generally expensive and time consuming, at least in part because it is most often applied to the received signals one trace at a time.

Optical data processing techniques have been applied to the processing of seismic data in the form of multi-trace records or cross sections, but so far as is known, these records or sections have all been in the form of traces where the received data are in the form of either primary brief impulses or have been time-compressed to be so by prior processing steps. One of the few known forms of optical processing of uncompressed data has again been as an optical analog of correlation in which two transparencies, one representing the pilot signal and the other the variable density received wave trace, are superimposed and manipulated to produce, as varying illumination, the usual correlation function. In practice, the advantages of optically producing the correlation function using two films in this way are more than offset by the additional time and effort of photographic processing, so that the presently preferred techniques of performing correlation use either digital computer programs or analog devices operating on magnetic tape.

In view of the foregoing, it is a primary object of our invention to provide a new way of time-compressing long duration vibratory signals without correlation in the usual sense and having the advantage of simultaneous multiple-channel processing characteristic of optical data processing of records and cross sections.

SUMMARY OF THE INVENTION

Briefly stated, this is accomplished in our invention by using as the input signal one having a form corresponding generally to the variations in density that are encountered in scanning along a radial segment of a Fresnel zone plate. Such a signal, recorded in the form of a variable density trace, like the original segment of zone plate from which it was taken, retains the property of the zone plate to focus the fraction of monochromatic light incident on the plate that is diffracted by the alternating opaque and transparent zones. Furthermore, this is true even though the frequencies corresponding to the central zones of the plate are omitted. Also, although the received waves may represent the partial overlapping of two or more different zone plate radial segments, each of the overlapping segments acts independently to focus the light which it diffracts to its own characteristic focal point.

In practice, it has been found that any long duration signal for which the frequency varies as a linear function of time corresponds so closely to a Fresnel signal as to focus monochromatic light in essentially the same way. That is to say, if the instantaneous value of the frequency as a function of time from the beginning of the signal plots as a sloping, straight line on a graph of frequency versus time, then a variable density trace representation of this signal performs as a Fresnel zone plate segment in diffracting and focusing monochromatic light.

The preferred embodiments of our invention therefore comprise using, in ordinary vibratory field-recording procedures, a pilot signal of many cycles duration, for which the frequency varies as the opacity of a Fresnel zone plate radially scanned at a constant rate, or for which the frequency varies substantially linearly with time; directly recording or otherwise putting the received waves into the form of corresponding variable density traces; illuminating the traces at an appropriate size scale with monochromatic light; and recording or otherwise indicating the concentrations of said light that occur in the focal plane of the equivalent Fresnel zone plate, which concentrations of illumination represent by their relative positions and intensities the travel times and relative intensities of seismic wave transmission by corresponding paths through the earth.

As the variable density recording transmits directly substantial amounts of light in addition to those diffracted to the focal points of the equivalent Fresnel zone plate segments, it is desirable to mask off or otherwise prevent this directly transmitted portion of the illuminating beam from affecting the measuring or recording of the focused, diffracted light at the Fresnel foci. This may be done in any of several ways, but is probably most simply accomplished by a window mask at the variable density record or cross section, which mask preferably encompasses the length of only one variable density replica of the pilot signal at a time, cooperating with a narrow slit mask at the Fresnel focal plane positioned to pass only the diffracted, focused light from the particular replica exposed in the cross section window. The window and slit masks scan in synchronism along the time dimensions of the uncompressed and the compressed records or sections.

While the time-compressed record or cross section can be produced directly on a photographic film behind the Fresnel focus scanning slit, it is often desired to subject the time-compressed data to further record-processing operations, and this can be accomplished simply by an array of photocell elements behind the focal plane slit, one for each trace, the outputs of which are transmitted to any desired recorder, such as a multi-trace magnetic or digital recording system, as may be appropriate.

This will be better understood by reference to the accompanying drawings forming a part of this application and illustrating typical and preferred embodiments of the invention. In these drawings, FIG. 1 is an enlarged view of a conventional Fresnel zone plate as known in optics;

FIG. 4 is a partially exploded, diagrammatic detail view of parts of FIG. 3 illustrating its operation; and FIG. 5 is an isometric diagrammatic view of an alternative Fresnel focal illumination detecting means.

Figure 1:
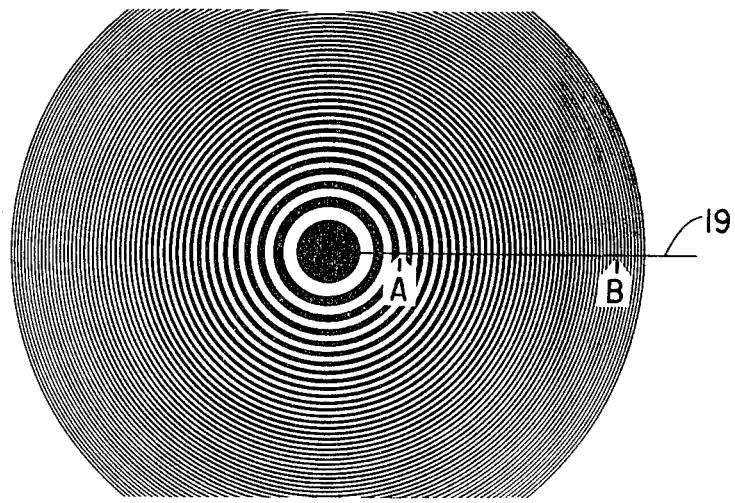

Referring now to these drawings and particularly to FIG. 1 thereof, this figure is a much enlarged view of a conventional Fresnel zone plate known in optics and possessing properties uniquely useful in respect to the present invention. Thus, the zone plate is a series of alternating black and white, or transparent and opaque, concentric rings surrounding a central spot, the width of the rings, upon proceeding away from the central spot along a radius, being such that they represent substantially equal increments of area. The properties of such plates are described in many optics textbooks; for example, see *Concepts of Classical Optics*, by John Strong (1958), published by W. H. Freeman and Company, pp. 187–190.

Briefly, it is a property of the Fresnel zone plate that, if it is placed in a beam of monochromatic light illuminating it perpendicularly, the transparent zones between the black or opaque zones act as spaced diffracting slits such that the diffracted light is brought to an essentially point focus at some distance along the axis line of the plate. This occurs for the reason, which will be explained more in detail below, that the optical path lengths to the focal point are equal for all of the illumination passing through and diffracted by any one circular transparent zone, while the optical path lengths for successive adjacent transparent zones differ by increments of exactly one wave length of the incident monochromatic light. Thus, for the light which the plate diffracts, constructive interference (or reinforcement) occurs at the focal point so that the zone plate acts like a positive lens. This focusing property of the Fresnel zone plate for a beam of incident monochromatic light operates regardless of whether the zones make complete concentric circles, or consist only of radial segments or parts of such segments. Furthermore, the same point of focus occurs if the central zones of the plate are completely opaque so that light transmission and diffraction occur only from zones or segments at some distance from the center.

In accordance with our invention, advantage is taken of the focusing property of a Fresnel zone plate for monochromatic light by employing as the pilot signal in vibratory seismic surveying, a signal corresponding to the variations in opacity of a Fresnel zone plate encountered in scanning at a constant rate along a radius such as from A to B (or from B to A) of radius 19 of the plate of FIG. 1. Such a signal, recorded in variable density trace form, therefore closely resembles the radial segment of the zone plate, and, when the trace is illuminated by monochromatic light, it diffracts the light to a focal point or line on the axis of the corresponding equivalent Fresnel zone plate in exactly the same manner as the zone plate from which the signal was derived by scanning. Furthermore, we have noted that the difference between a signal generated by uniform rate scanning along a zone plate radius and one in which the rate of frequency variation with time is exactly linear, if indeed such difference exists, is so small that time compression of a linearly swept frequency signal occurs in so nearly the same way as to be indistinguishable from the compression of a true Fresnel signal.

The general similarity between a variable density trace recording of seismic waves and a radial segment of a Fresnel zone plate has been noted and discussed in some aspects by P. L. Jackson in *Geophysics*, February 1965, pp. 12–16.

Figure 2:
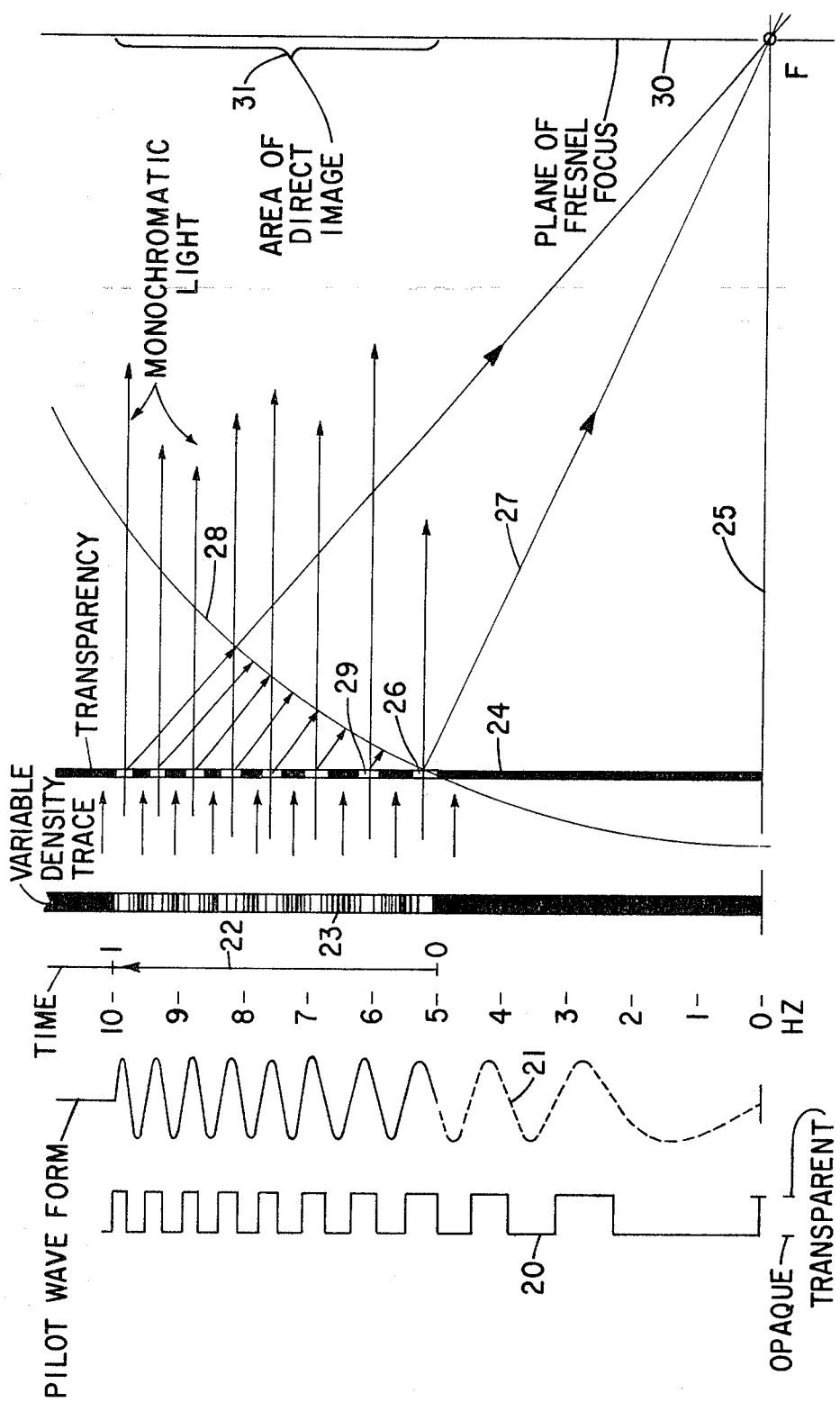
FIG. 2 is a drawing, partially graphical and partially schematic, showing the equivalence of a zone plate and a variable density recording as used in the present invention.

Turning now to FIG. 2, this figure explains in greater detail the points of correspondence and of difference between the conventional Fresnel zone plate and a Fresnel and a linear frequency sweep signal as used in the present invention. Thus, graph 20 at the left of this figure is a plot on a somewhat enlarged scale of the actual wave form of opacity and transparency of the zone plate of FIG. 1, starting from the center of the central zone and moving radially outwardly across twenty adjacent zones. As is apparent, this is a square or block wave from which alternates between complete opacity and complete transparency at decreasing time intervals, assuming that the radial scanning takes place at a constant rate. The sinusoidal graph 21 is the exact sine wave equivalent of the square wave 20, having its zero axis crossings at exactly the same relative positions or times when the square wave 20 changes from transparency to opacity and vice versa. If it is assumed that the scanning to produce the square wave 20 takes place at a constant rate during a time interval of 2 seconds, then the matching sinusoidal wave 21 corresponds to a uniform rate frequency sweep from 0 to 10 hertz at a rate of 5 hertz per second.

In the usual terminology of vibratory seismic surveying, the lower terminal frequency of the frequency sweep employed is not usually "zero" frequency, so only the solid line portion of the sinusoidal graph 21 would normally be used as the pilot wave form for the seismic vibrator. That is, only the last half of the 2-second sweep signal would be employed to control the vibrator input frequency, starting from a frequency of 5 hertz and ending at a frequency of 10 hertz over the time duration of 1 second, thus amounting to a linear frequency sweep with a slope or rate of frequency change of 5 hertz per second. The time ordinate 22 thus represents elapsed time from the start of an input 5-to-10-hertz sinusoidal frequency upsweep of the conventional form used in vibratory surveying. The ordinates to the immediate right of graph 21 correspond to instantaneous frequency along the duration of the sweep. In practice, pilot wave form 21 can be employed in either direction — that is, as an upsweep or as a downsweep, the focus being always offset from the low frequency end.

The variable density trace 23 correlated in position with respect to traces 20 and 21 represents the appearance of the pilot wave form 21 as it is recorded either by a monitor receiver during introduction into the earth or as received at a detector after travel through the earth by one particular travel path. The effective length of this signal trace is 1 second, the part preceding and following the segment corresponding to time ordinate 22 being blank, either intermediate in density, completely transparent, or completely opaque. For convenience, it is shown on the drawing as completely opaque.

The vertical bar or line 24 represents vertical trace 23 turned edgewise, the dense portions of trace 23 being shown as completely opaque zones, while the transparent portions are represented as openings, all at their corresponding positions. Thus, the representation of line 24 corresponds fairly closely to the portion of square wave trace 20 between the time of 1 and 1 2 seconds, although it will be understood that in practice the gradation between opacity and transparency of the respective zones is gradual rather than abrupt as shown in the drawing. The horizontal line 25 represents the axis of the equivalent zone plate, and it is at some distance along this line that the focus F of light passing through the zone plate segment represented by line 24 must occur.

The parallel arrows impinging from left to right on plate segment 24 represent monochromatic light, preferably but not necessarily collimated into a beam of parallel rays. Considering aperture 26 closest to axis 25, light passes through this aperture, but due to the fact that it is in practice a narrow slit, a substantial fraction is diffracted in all directions to the right of line 24 including some along a radius line 27 passing through the center of aperture 26 and describing an arc 28 with the axial point F as a center. With respect to point F and arc 28, the mid-point of adjacent aperture 29 is exactly 1 wave length of the incident monochromatic light further removed from point F than is the mid-point of aperture 26. Similarly, each successive aperture above aperture 29 is one additional wave length of light further removed from point F, the result being that some of the light diffracted at each of the apertures forms a converging wave front concentric with arc 28 and coming to a focus at point F.

Strictly speaking, the focus at F occurs not at a "point" but a line about equal in length to the width of trace 23. This is because the zone boundaries are straight lines rather than arcs of concentric circles, the difference being analogous to that between a cylindrical and a spherical lens.

If a plane 30 perpendicular to axis 25 and passing through F is regarded as the plane of the Fresnel focus for the zone plate segment replica 24, then the light passing without diffraction through the apertures 26, 29, etc., of the zone plate segment intersects plane 30 over an area 31. As this direct illumination is ordinarily of quite substantial strength, it is not enough merely to locate in the plane 30 a photographic film or other detector of the illumination converging at F, but in addition some means of preventing direct image 31 from interfering with the desired light concentrations at F in plane 30 is usually necessary.

If the monochromatic illumination, which should come from an essentially point source rather than a diffuse source, is not exactly collimated but is either diverging or converging, then the position of focus F and plane 30 is correspondingly farther from or closer to replica 24 than the illustrated position for the collimated beam. Also, if a lens is inserted between replica 24 and plane 30, the position of the resultant focus F is shifted along axis 25 in accordance with well-known geometrical optical relationships applying to two lenses in combination. A converging lens of shorter effective focal length than replica 24 can, in fact, provide two foci, one corresponding to the real focus F and another which is a virtual focus of replica 24, with opposite offset from direct image 31 as shown in the *Geophysics* reference cited above.

As equipment and procedures for obtaining and recording vibratory field data are well known in the art and their details are not necessary to an understanding of the present invention, it is merely pointed out that the field recording may be done as shown, for example, in Doty U.S. Pat. No. 3,065,453, where the magnetic trace 56 is a pre-recorded signal used for controlling the operation of a vibrator. In accordance with the present invention, this trace would contain a Fresnel signal or linear frequency sweep preferably of sinusoidal form like the solid line portion of trace 21 in FIG. 2. Each composite output trace of Doty's recorder would be either directly recorded or subsequently transcribed into one of a plurality of parallel variable density traces constituting a record or cross section to be time-compressed in accordance with the present invention.

Figure 3:
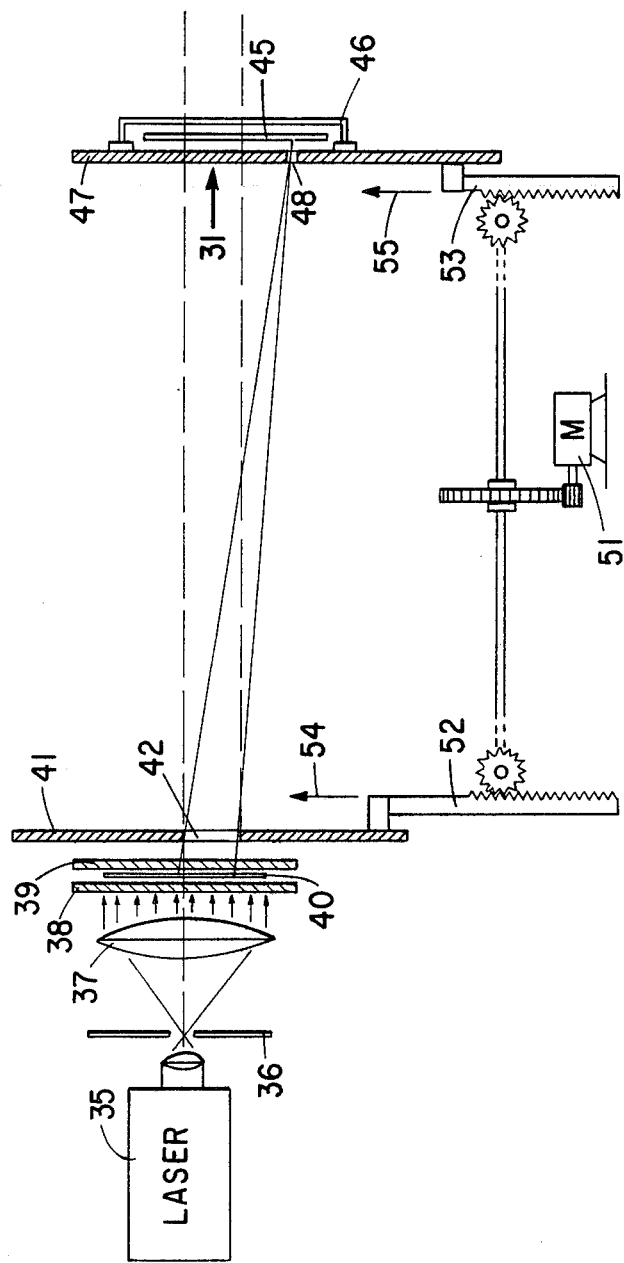
FIG. 3 is a partial schematic plan view of apparatus for performing time compression in accordance with the invention.

Referring now to FIG. 3, in this figure is shown in diagrammatic or schematic form a preferred embodiment of apparatus for time-compressing vibratory seismic records in accordance with our invention. This may be considered a plan view with the time dimension of the recorded traces in the plane of the drawing. Thus, monochromatic light from a source such as laser 35 is passed through a pin hole mask 36 and formed into a collimated beam by a lens 37. Held in the beam coming from collimator 37 between a pair of flat glass plates 38, 39, is the cross section or variable density record 40 to be time-compressed. Immediately adjacent record 40 and plates 38, 39 is an aperture mask 41 having the aperture 42 passing a beam of light just sufficient in width (i.e., in the time dimension) to accommodate the pilot wave form. Some distance away and slightly offset from the optical axis of the system at the Fresnel focal plane is an unexposed photographic film or plate 45 in a light tight holder 46, immediately in front of which is a slit mask 47 having a narrow slit 48 at the exact position of the focus F. Masks 41 and 47 are movable in synchronism by suitable mechanical drive means such as a motor 51, driving rack and gear mechanisms 52 and 53, the arrows 54 and 55 designating the directions of motion of the respective masks as being the same. The sense of the scanning motion is immaterial — i.e., if it were reversed for both masks, the resulting compressed record would not change.

The operation of this embodiment may be more easily understood by reference to FIG. 4, which is a partially exploded isometric view of the cross section and masks. In this figure as in FIG. 3, it is assumed that the parallel variable density traces on the record 40 shown as parallel bands extend in a horizontal (time) direction parallel to the directions of motion 54 and 55 of the respective masks 41 and 47. The width of the aperture 42 is preferably just equal to the time duration of one pilot signal; or, in other words, the boundaries of the segments of the cross section data traces transmitted through mask 42 are given by the dotted lines 42a and 42b on section 40. Light which is transmitted through section 40 and aperture 42 without diffraction forms a direct image on mask 47 in the cross-hatched area 31, while at the instant when the ends of any replica of the pilot trace coincide with boundaries 42a and 42b, the corresponding Fresnel focus for this trace occurs on the line of slit 48 in mask 47. Thus, any concentrations of light at slit 48 will pass through and be registered on the film 45, the outline of which is shown dotted in FIG. 4. The position of each light concentration will be at the instantaneous location of slit 48 during its scan.

In many instances it will be desirable, as shown in FIG. 5, to replace the film 45 by an array of photocells 59 attached directly behind slit aperture 48 and moving along with the mask 47. The outputs of these photocells, one for each trace of the record or section 40, are then transmitted by the leads 60 to a digital or magnetic trace recorder of any desired or conventional type for recording the time-compressed traces in a form most suitable for further processing.

Actually, the illustration of mask 41 as having the window 42 spanning one pilot signal replica length of the record 40 is only a preferred example, the effective part of the mask being that which prevents directly transmitted light from falling on slit 48. Much the same result would be provided by a simple vertical movable bar at the position of mask 41 which for the direct illumination casts its shadow on slit 48.

By way of example but not of limitation, the following is given as a typical embodiment of our invention in operation: Assume that the input signal is a linear frequency sweep going from 20 to 80 hertz in 6 seconds. Thus, this is a linear sweep with a constant rate of change of 10 hertz per second. In field operations, using a sweep of such length, the recording of the received waves would continue through an interval of about 14 seconds. In order to facilitate processing, the variable density traces of 14 seconds record time length would be either originally recorded or subsequently photographically reduced to occupy a space of 28 millimeters on a 35-millimeter transparency film. The time scale of the transparency to be optically processed is thus one second equals 2 millimeters.

To relate this sweep to a Fresnel zone plate, it is to be noted that a 20-to-80 hertz sweep in a time interval of 6 seconds is exactly equivalent to the latter part of a sweep from 0-to-80 hertz in 8 seconds. The latter sweep corresponds to scanning from the center of a Fresnel zone plate across 320 pairs of opaque and transparent zones in 8 seconds. At the 1 inch equals 2 mm. assumed scale of photographic reduction, the full 8 seconds of sweep from 0-to-80 hertz would occupy a trace length of 16 millimeters, the actual sweep from 20-to-80 hertz therefore occupying 12 millimeters leaving a spacing of 4 millimeters between the Fresnel focus F on the axis 25 of the equivalent zone plate and the nearest point of the area 31 of the direct image. That is, the width of aperture 42 (from boundary 42a to 42b) is 12 millimeters. The focal length or distance between the transparency 40 and the focus F at film 45, of course, depends upon the wave length of the illumination provided by laser 35. Letting this be 6,328 angstroms corresponding to the output of the He-Ne laser in wide use, a simple calculation shows that the focus F occurs at about 25 inches from the transparency 40.

The extent to which each variable density replica of the pilot waveform that corresponds to one seismic wave travel path acts independently of others which overlap it to produce a single concentration or focal spot of the incident monochromatic light depends on the density variations of the recorded trace staying within the linear portion of the film characteristic (H. and D.) curve. Recorded trace densities that due to overlap fall outside the linear response range of the film (or other medium) represent a kind of cross-modulation distortion; but for most purposes this will not be significantly harmful, as only the indicated relative amplitudes rather than the travel times of the seismic waves are affected.

While a photographic film 40 has been shown for illustrative purposes as the medium on which the original variable density traces to be time-compressed are recorded for insertion into the beam of monochromatic light, it is to be understood that media other than photographic film (which requires chemical processing) might be employed to advantage in many instances. For example, a photochromic medium might first be impressed with the variable density traces to be time-compressed using radiation in one wave length range to which the medium is sensitive, followed immediately by inserting it into a monochromatic beam of different wave length to which the photochromic medium is insensitive, for time compression at the equivalent Fresnel focal plane. Likewise, instead of transmission through a photochromic or photographic film, the variable density traces might be recorded in the form of varying reflectivity traces, and the Fresnel focal concentrations of light representing time-compressed signals could be produced by the diffraction of the reflected light from the narrow reflective zones.

While Fresnel and linear frequency sweep signals constitute the preferred forms of pilot wave trains that are self-compressing in monochromatic light, the usefulness of the present invention is not limited thereto but extends to many non-linear sweeps for which there is some deviation from the constant slope, straight line plot of instantaneous frequency versus time characterizing linear sweeps. For example, some sweeps that follow a logarithmic or exponential curve of frequency versus time to preemphasize certain parts of the frequency range can be compressed in this way to a useful degree, where the overlapping of arrivals is substantially reduced, and this partial time compression can then be carried further if desired by Wiener filtering or the like.

In view of this and the foregoing specific examples, still further embodiments and modifications should now be apparent to those skilled in the art.

We claim:

1. A method of seismic geophysical surveying which comprises the steps of
    transmitting through the earth from a transmitting location to at least one receiving location spaced therefrom seismic waves that vary in frequency substantially linearly with time so as to correspond generally to the variations in density encountered in scanning along a radial segment of a Fresnel zone plate at a substantially constant rate,
    recording as a function of time the resulting waves received at said receiving location as a variable density trace,
    illuminating said trace with collimated monochromatic light,
    recording the relative positions and intensities of any concentrations of said light that occur in an equivalent Fresnel focal plane, as indications of the travel times and amplitudes of seismic waves traveling by various paths between said transmitting and receiving locations, and
    intercepting substantially all of said monochromatic light leaving said trace without being diffracted, so that said light concentrations consist essentially of light diffracted by said trace to corresponding Fresnel foci,
    said intercepting step comprising masking off substantially all of said Fresnel focal plane except for a slit opening at the position of Fresnel focus of a replica of said transmitted waves on said trace, and masking off at least that portion of said trace from which said illumination would travel without diffraction directly to said slit.

2. A method as in claim 1 in which said trace-masking step comprises
    masking off substantially all of said trace except at a window about equal in width to the span in said trace of a replica of said transmitted waves, said replica when centered in said window having its focus at said slit.

3. A method as in claim 1 in which
    said transmitting step comprises transmitting said seismic waves through the earth from a transmitting location to a plurality of receiving locations spaced therefrom and from each other,
    said recording step comprises recording as a function of time the resulting waves received at each of said receiving locations as one of a corresponding plurality of side-by-side variable density traces,
    said illuminating and light concentration recording steps being carried out for all of said plurality of traces simultaneously, said masking-off steps comprising
    interposing in front of said Fresnel focal plane a mask having a slit opening at the position of Fresnel foci for replicas of said transmitted waves occurring simultaneously in said traces, interposing adjacent said traces a mask blocking at least that part of said illumination that would travel directly without diffraction to said slit, and including the further step of
    traversing said masks in synchronism relative to the time dimension of said traces.

4. A method as in claim 3 in which said step of interposing a mask adjacent said traces comprises
    masking off substantially all of said traces except at a window about equal in width to the span in said traces of a replica of said transmitted waves, and said traversing step comprises
    maintaining said window at a position adjacent said traces such that the Fresnel focus for a replica centered in said window coincides with said slit.

5. Apparatus for time-compressing received signals in vibratory seismic surveying using at least approximately linear frequency sweep seismic waves which are generated in the earth by a servo-controlled vibrator, received by a seismometer spaced therefrom, and recorded as a corresponding variable density trace as a function of time, said time-compressing apparatus comprising
    a source of monochromatic light and means for forming light from said source into a collimated beam,
    means for supporting said variable density trace in said beam to transmit and diffract said monochromatic light,
    means to record the relative positions and intensities of concentrations of said light diffracted by replicas of said generated waves in said trace to foci in the equivalent Fresnel zone plate focal plane, which positions and intensities correspond to the relative travel times and amplitudes of seismic waves along various paths through the earth between said vibrator and said seismometer,
    masking means adjacent said trace and said Fresnel focal plane to prevent light transmitted but not diffracted by said trace from falling on said plane, and
    means for relatively moving said masking means and said trace and plane parallel to the time dimension of said trace.

6. Apparatus as in claim 5 in which said masking means comprises
    a mask covering said Fresnel focal plane except for a slit at the position of Fresnel focus of one of said replicas in said trace, and
    a mask at said trace covering at least that portion of said trace from which said light would travel directly without diffraction to said slit, the portion of said trace containing said one replica not being covered.

7. Apparatus as in claim 6 in which said trace mask is a mask substantially covering all of said trace except for a window about equal in width to the length of said one replica in said trace, at the position of said replica.

8. Apparatus as in claim 5 in which said means to record said light concentrations comprises a photosensitive film in said Fresnel focal plane.

9. Apparatus as in claim 5 in which said means to record said light concentrations comprises a photosensitive detector producing an electrical output proportional to the intensity of said monochromatic light impinging thereon, and
    means to traverse said detector across said focal plane parallel to the time dimension of said trace.

* * * * *